United States Patent
Liu et al.

(10) Patent No.: US 10,959,109 B1
(45) Date of Patent: Mar. 23, 2021

(54) CREATING AND USING NETWORK COVERAGE MODELS

(71) Applicant: AT&T Intellectual Property I, L.P., Atlanta, GA (US)

(72) Inventors: Danielle Liu, Morganville, NJ (US); Arun Jotshi, Parsippany, NJ (US); Gaurav Thakur, Matawan, NJ (US); Velin Kounev, Weehawken, NJ (US); Fei Wu, Jersey City, NJ (US); Yaron Kanza, Fair Lawn, NJ (US); Divith Aruni Babu, St. James, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/802,867

(22) Filed: Feb. 27, 2020

(51) Int. Cl.
*H04W 16/18* (2009.01)
*G06N 3/04* (2006.01)
*G06N 3/08* (2006.01)
*G06K 9/00* (2006.01)
*H04W 64/00* (2009.01)

(52) U.S. Cl.
CPC ........ *H04W 16/18* (2013.01); *G06K 9/00637* (2013.01); *G06N 3/04* (2013.01); *G06N 3/084* (2013.01); *H04W 64/003* (2013.01)

(58) Field of Classification Search
CPC .... H04B 10/0773; H04B 3/46; G06K 9/0063; G06K 9/00651; G06K 9/627; G06K 9/3233; G06K 9/4604; G06K 9/52; G06K 9/6256; G06K 9/6262; G06K 9/66; G06K 2009/366; G06K 2209/21; G06K 9/00805; G06K 9/4652; G06K 9/6202; G06K 9/6215; G06K 9/00637; H04L 43/08; H04W 16/18; H04W 64/003; G06N 3/04; G06N 3/084
See application file for complete search history.

(56) References Cited

U.S. PATENT DOCUMENTS

| | | | |
|---|---|---|---|
| 8,503,794 B2 * | 8/2013 | Omer | G06K 9/68 382/209 |
| 2010/0103868 A1 * | 4/2010 | Meng | H04W 16/18 370/328 |
| 2016/0358190 A1 * | 12/2016 | Terrazas | G06F 16/29 |
| 2017/0019797 A1 * | 1/2017 | Rubio | G06K 9/00476 |
| 2017/0301104 A1 * | 10/2017 | Qian | G06F 16/583 |

* cited by examiner

*Primary Examiner* — Daniel Lai
(74) *Attorney, Agent, or Firm* — Hartman & Citrin LLC

(57) ABSTRACT

Concepts and technologies are disclosed herein for creating and using network coverage models. A request for a predicted coverage model that represents a first signal propagation in a first portion of a network that covers a first area associated with a first geographic location can be received. An aerial image that depicts the first area can be obtained. The aerial image can be provided to an existing coverage model. The existing coverage model can include a neural network, and the existing coverage model can be based on a second signal propagation in a second portion of the network that covers a second area associated with a second location. The predicted coverage model for the first area can be obtained from the existing coverage model.

20 Claims, 9 Drawing Sheets

CREATING AND USING NETWORK COVERAGE MODELS

BACKGROUND

In some instances, signal strength may affect network quality and/or quality of service. As such, signal strength may be used as a measure of quality of service in some instances. Signal strength, or more accurately perceived signal strength at some point in space by a receiver, may be impacted by geospatial parameters such as the terrain, buildings, vegetation, or the like. When network hardware is deployed, the location may be set for the hardware based on various considerations (e.g., zoning, real estate cost, etc.).

When evaluating a particular installation site, an expected signal strength may be predicted using one or more prediction algorithms, simulations, or the like. While these approaches may provide some prediction of signal strength, real world measurements are the only way to accurately know the signal strength and/or other signal measurement parameters. Measuring, however, may not be possible before installation, and at any rate may require manual surveys, which may be an expensive and slow process.

Another approach used to measure signals in a particular area can include polling user devices (e.g., mobile phones or the like) in a particular area to measure and report their perceived signal strength. Again, prior to installation of network hardware, such an approach may not provide any meaningful data. Also, some devices may be unable to communicate such data and/or a lack of enough data samples from such an area may render such information useless.

When construction work in a particular area and/or seasonal effects like rain, snow, and/or temperature are to be analyzed for impact on signal parameters, however, there may be no way to accurately model such impacts.

SUMMARY

The present disclosure is directed to creating and using network coverage models. A modeling and prediction engine can be hosted by a computing device. The modeling and prediction engine can be configured to generate a predicted coverage model for a particular geographic location or area such as, for example, a possible or planned installation site for network hardware (e.g., an eNodeB, gNodeB, or other type of transceiver, or other hardware), a contemplated expansion area for a network, and/or other geographic areas and/or geographic locations. The modeling and prediction engine can receive an explicit request or call for the predicted coverage model, in some embodiments, or a user or device may interact with the modeling and prediction engine using a portal, user interface, application programming interface ("API"), or other interface. In some other embodiments, the modeling and prediction engine receives a request for existing coverage information (e.g., signal strength measurements, etc.) for a particular location, and the modeling and prediction engine can determine, e.g., based on an analysis of one or more instances of existing coverage information, that no existing coverage information for the geographic location and/or area exists or is accessible.

If no existing coverage information for the particular geographic location and/or area exists or is accessible, the modeling and prediction engine can be configured to create the predicted coverage model using an existing coverage model. In particular, the modeling and prediction engine can access or create an existing coverage model. The existing coverage model can be generated by the modeling and prediction engine based on existing coverage information for one or more other geographic area(s). The existing coverage information can be obtained and slices can be generated based on the existing geographic information. One or more of the slices can represent a transceiver such as an eNodeB, a bin or other measurement point, a line of sight between the eNodeB and bin, obstructions between the eNodeB and bin, transmission power or other signal transmission information associated with the eNodeB, and perceived signal strength or other signal information as perceived at the bin. The modeling and prediction engine can be configured to create the existing coverage model. In some embodiments, the modeling and prediction engine can be configured to use artificial intelligence (e.g. a neural network) to create the existing coverage model, where some or all of the slices can be provided as input to the modeling and prediction engine, and the modeling and prediction engine can create the existing coverage model. The existing coverage model can correspond to a set of algorithms (e.g., a neural network) that can obtain a first aerial image or map representation as input and create a predicted coverage model based on the aerial imagery and/or the map representation.

The modeling and prediction engine can identify a geographic location associated with the request for the predicted coverage model and obtain aerial imagery and/or a map representation for the particular geographic location and/or area for which the predicted coverage model is being created. The modeling and prediction data can include an aerial image for the particular geographic location and/or area for which the predicted coverage model is being created.

The modeling and prediction engine can generate the predicted coverage model for the particular geographic location and/or area for which the predicted coverage model is being created. The predicted coverage model can be used and/or interpreted to estimate coverage in the particular geographic location and/or area for which the predicted coverage model is being created based on information included in the existing coverage model (e.g., perceived signal strength at specific measurement locations that are separated from the eNodeB that emitted the signal, where the distance and obstructions between the measurement location and the eNodeB are known from the existing coverage models). The modeling and prediction engine can provide the predicted coverage model to a requestor for use and/or analysis.

According to one aspect of the concepts and technologies disclosed herein, a system is disclosed. The system can include a processor and a memory. The memory can store computer-executable instructions that, when executed by the processor, cause the processor to perform operations. The operations can include receiving a request for a predicted coverage model that represents a first signal propagation in a first portion of a network that covers a first area associated with a first geographic location; obtaining an aerial image that depicts the first area; and providing the aerial image to an existing coverage model. The existing coverage model can include a neural network and the existing coverage model can be based on a second signal propagation in a second portion of the network that covers a second area associated with a second geographic location. The operations further can include obtaining, using the aerial image and from the existing coverage model, the predicted coverage model for the first area.

In some embodiments, the existing coverage model can be generated by obtaining a map representation of the second area; obtaining network data for the second area; and generating, based on the map representation and the network data, the existing coverage model. The network data can include signal information measured at a point in the second area. In some embodiments, the predicted coverage model can represent obstructions between two points in the first area and an expected signal measurement at one of the two points.

In some embodiments, the map representation can be generated by performing an image processing operation on an aerial image that can depict the second area. A first color can depict an open space in the map representation, and a second color can depict an obstruction in the map representation. In some embodiments, the obstruction can include one of a building or a tree. In some embodiments, the predicted coverage model can be generated by determining a geographic location associated with the request. The geographic location can include the first geographic location. The predicted coverage model can further be generated by obtaining a further aerial image that can depict a portion of the first area; and performing an image processing operation on the further aerial image to generate a further map representation. In some embodiments, the existing coverage model can be generated by obtaining a map representation of the second area; obtaining network data for the second area; creating, based on the map representation and the network data, a plurality of slices, each of the plurality of slices depicting a first location of a first device that emits a signal, a second location at which the signal is measured, a line of sight between the first location and the second location, and obstructions along the line of sight; and creating the existing coverage model based on the plurality of slices.

According to another aspect of the concepts and technologies disclosed herein, a method is disclosed. The method can include receiving, at a computer including a processor, a request for a predicted coverage model that represents a first signal propagation in a first portion of a network that covers a first area associated with a first geographic location; and obtaining, by the processor, an aerial image that depicts the first area; and providing the aerial image to an existing coverage model. The existing coverage model can include a neural network and the existing coverage model can be based on a second signal propagation in a second portion of the network that covers a second area associated with a second geographic location. The method further can include obtaining, by the processor and using the aerial image, the predicted coverage model for the first area. The predicted coverage model can be obtained from the existing coverage model.

In some embodiments, the existing coverage model can be generated by obtaining a map representation of the second area; obtaining network data for the second area; and generating, based on the map representation and the network data, the existing coverage model. The network data can include signal information measured at a point in the second area. In some embodiments, the predicted coverage model can represent obstructions between two points in the first area and an expected signal measurement at one of the two points. In some embodiments, the map representation can be generated by performing an image processing operation on an aerial image that can depict the second area. A first color can depict an open space in the map representation, and a second color can depict an obstruction in the map representation.

In some embodiments, the predicted coverage model can be generated by determining a geographic location associated with the request. The geographic location can include the first geographic location. The predicted coverage model can further be generated by obtaining a further aerial image that can depict a portion of the first area; and performing an image processing operation on the further aerial image to generate a further map representation. In some embodiments, the existing coverage model can be generated by obtaining a map representation of the second area; obtaining network data for the second area; creating, based on the map representation and the network data, a plurality of slices, each of the plurality of slices depicting a first location of a first device that emits a signal, a second location at which the signal is measured, a line of sight between the first location and the second location, and obstructions along the line of sight; and creating the existing coverage model based on the plurality of slices.

According to yet another aspect of the concepts and technologies disclosed herein, a computer storage medium is disclosed. The computer storage medium can store computer-executable instructions that, when executed by a processor, cause the processor to perform operations. The operations can include receiving a request for a predicted coverage model that represents a first signal propagation in a first portion of a network that covers a first area associated with a first geographic location; obtaining an aerial image that depicts the first area; and providing the aerial image to an existing coverage model. The existing coverage model can include a neural network and the existing coverage model can be based on a second signal propagation in a second portion of the network that covers a second area associated with a second geographic location. The operations further can include obtaining, using the aerial image and from the existing coverage model, the predicted coverage model for the first area.

In some embodiments, the existing coverage model can be generated by obtaining a map representation of the second area; obtaining network data for the second area; and generating, based on the map representation and the network data, the existing coverage model. The network data can include signal information measured at a point in the second area. In some embodiments, the predicted coverage model can represent obstructions between two points in the first area and an expected signal measurement at one of the two points.

In some embodiments, the map representation can be generated by performing an image processing operation on an aerial image that can depict the second area. A first color can depict an open space in the map representation, and a second color can depict an obstruction in the map representation. In some embodiments, the obstruction can include one of a building or a tree. In some embodiments, the predicted coverage model can be generated by determining a geographic location associated with the request. The geographic location can include the first geographic location. The predicted coverage model can further be generated by obtaining a further aerial image that can depict a portion of the first area; and performing an image processing operation on the further aerial image to generate a further map representation. In some embodiments, the existing coverage model can be generated by obtaining a map representation of the second area; obtaining network data for the second area; creating, based on the map representation and the network data, a plurality of slices, each of the plurality of slices depicting a first location of a first device that emits a signal, a second location at which the signal is measured, a line of sight between the first location and the second location, and obstructions along the line of sight; and creating the existing coverage model based on the plurality of slices.

Other systems, methods, and/or computer program products according to embodiments will be or become apparent to one with skill in the art upon review of the following drawings and detailed description. It is intended that all such additional systems, methods, and/or computer program products be included within this description, and be within the scope of this disclosure.

DETAILED DESCRIPTION

Figure 1:
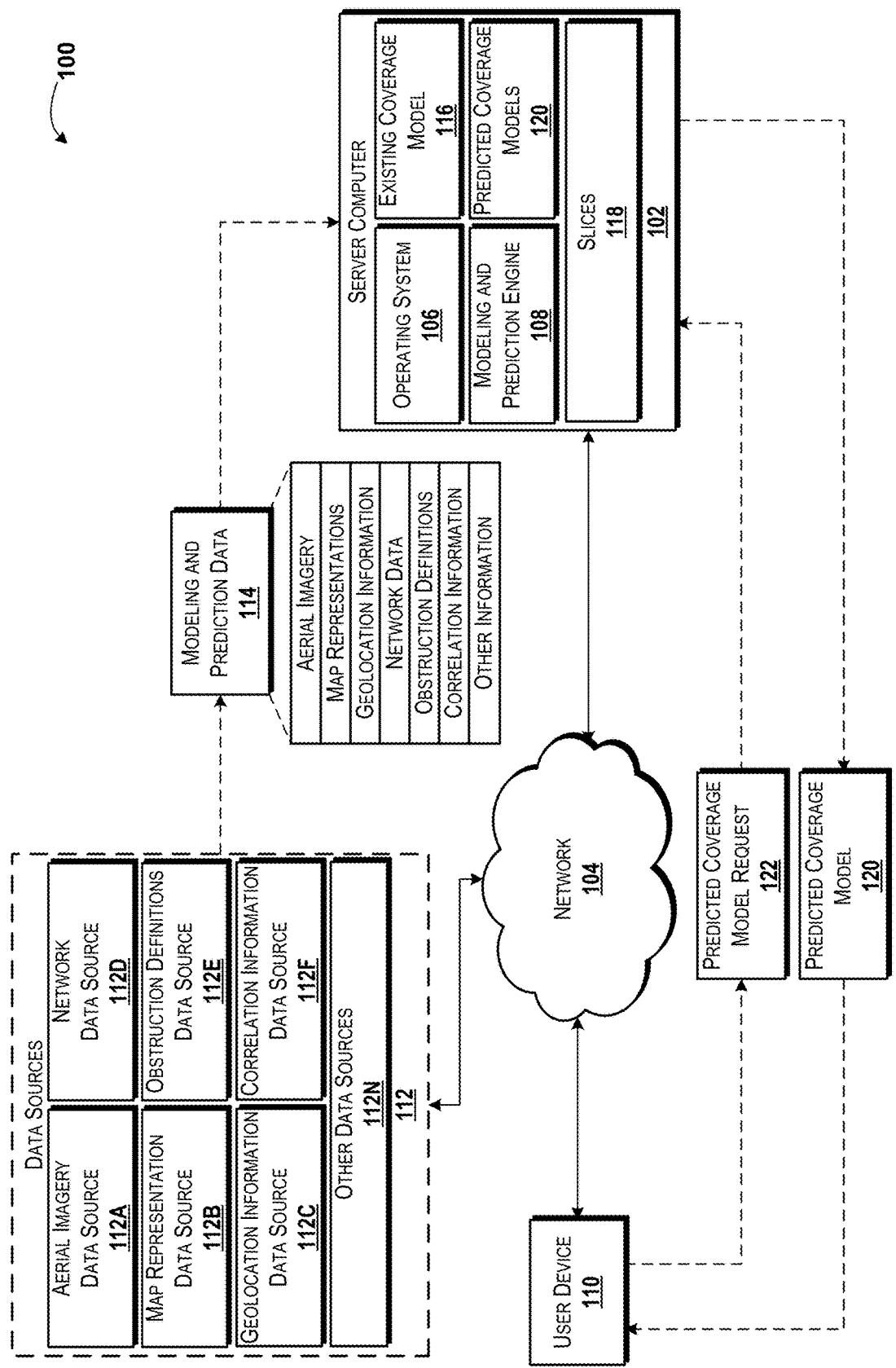
FIG. 1 is a system diagram illustrating an illustrative operating environment for various embodiments of the concepts and technologies described herein.

The following detailed description is directed to creating and using network coverage models. A modeling and prediction engine can be hosted by a computing device. The modeling and prediction engine can be configured to generate a predicted coverage model for a particular geographic location or area such as, for example, a possible or planned installation site for network hardware (e.g., an eNodeB, gNodeB, or other type of transceiver, or other hardware), a contemplated expansion area for a network, and/or another geographic areas and/or geographic locations. The modeling and prediction engine can receive an explicit request or call for the predicted coverage model, in some embodiments, or a user or device may interact with the modeling and prediction engine using a portal, user interface, application programming interface ("API"), or other interface. In some other embodiments, the modeling and prediction engine receives a request for existing coverage information (e.g., signal strength measurements, etc.) for a particular location, and the modeling and prediction engine can determine, e.g., based on an analysis of one or more instances of existing coverage information, that no existing coverage information for the geographic location and/or area exists or is accessible.

If no existing coverage information for the particular geographic location and/or area exists or is accessible, the modeling and prediction engine can be configured to create the predicted coverage model using an existing coverage model. In particular, the modeling and prediction engine can access or create an existing coverage model. The existing coverage model can be generated by the modeling and prediction engine based on existing coverage information for one or more other geographic area(s). The existing coverage information can be obtained and slices can be generated based on the existing geographic information. One or more of the slices can represent a transceiver such as an eNodeB, a bin or other measurement point, a line of sight between the eNodeB and bin, obstructions between the eNodeB and bin, transmission power or other signal transmission information associated with the eNodeB, and perceived signal strength or other signal information as perceived at the bin. The modeling and prediction engine can be configured to create the existing coverage model. In some embodiments, the modeling and prediction engine can be configured to use artificial intelligence (e.g. a neural network) to create the existing coverage model, where some or all of the slices can be provided as input to the modeling and prediction engine, and the modeling and prediction engine can create the existing coverage model. The existing coverage model can correspond to a set of algorithms (e.g., a neural network) that can obtain an aerial image or map representation as input and create a predicted coverage model based on the aerial imagery and/or the map representation.

The modeling and prediction engine can identify a geographic location associated with the request for the predicted coverage model and obtain aerial imagery and/or a map representation for the particular geographic location and/or area for which the predicted coverage model is being created. The modeling and prediction data can include an aerial image for the particular geographic location and/or area for which the predicted coverage model is being created.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for creating and using network coverage models will be described, according to an illustrative embodiment. The operating environment 100 shown in FIG. 1 includes a server computer 102. The server computer 102 can operate in communication with and/or as part of a communications network ("network") 104, though this is not necessarily the case.

According to various embodiments of the concepts and technologies disclosed herein, the functionality of the server computer 102 may be provided by one or more server computers, desktop computers, mobile telephones, laptop computers, other computing systems, and the like. It should be understood that the functionality of the server computer 102 can be provided by a single device, by two or more similar devices, and/or by two or more dissimilar devices. For purposes of describing the concepts and technologies disclosed herein, the server computer 102 is described herein as a server computer that hosts one or more applications, e.g., a web application that provides a web service. It should be understood that this embodiment is illustrative, and should not be construed as being limiting in any way.

The server computer 102 can execute an operating system 106 and one or more application programs such as, for example, a modeling and prediction engine 108. The operating system 106 can include a computer program for controlling the operation of the server computer 102. The modeling and prediction engine 108 can include an executable program that can be configured to execute on top of the operating system 106 to provide various functions as illustrated and described herein for creating and using network coverage models.

Although the modeling and prediction engine 108 is illustrated as a single application program or service that his executed by the server computer 102, it should be understood that in some embodiments of the concepts and technologies disclosed herein, the server computer 102 can execute a modeling engine and a prediction engine as two or more application programs or services. Furthermore, while the modeling and prediction engine 108 is illustrated as being hosted on the server computer 102, it should be understood that the modeling and prediction engine 108 and/or one or more functions thereof may be embodied as or in one or more stand-alone devices or one or more components thereof, which can operate as a part of or in communication with the network 104 and/or the server computer 102. As such, the illustrated embodiment should be understood as being illustrative of only some contemplated embodiments and should not be construed as being limiting in any way. Prior to explaining the functionality of the modeling and prediction engine 108 in additional detail, the elements of the operating environment 100 will be disclosed.

As shown in FIG. 1, the operating environment 100 also can include a user device or other device (hereinafter referred to as the "user device") 110. The functionality of the user device 110 can be provided by one or more server computers, desktop computers, mobile telephones, laptop computers, smart phones, other computing systems, and the like. For purposes of describing the concepts and technologies disclosed herein, the user device 110 is described herein as a personal computer. The user device 110 can be configured to interact with the server computer 102, e.g., through a portal, API, user interface, and/or other interfaces to perform various operations. It should be understood that this embodiment is illustrative, and should not be construed as being limiting in any way.

The operating environment 100 also can include a number of data sources 112A-N (hereinafter collectively and/or generically referred to as "data sources 112"). According to various contemplated embodiments of the concepts and technologies disclosed herein, and as shown in FIG. 1, the data sources 112 can include, but are not limited to, an aerial imagery data source 112A, a map representation data source 112B, a geolocation information data source 112C, a network data source 112D, an obstruction definitions data source 112E, a correlation information data source 112F, and other data sources 112N. It should be understood that additional and/or alternative data sources 112 are possible and are contemplated.

Figure 2:
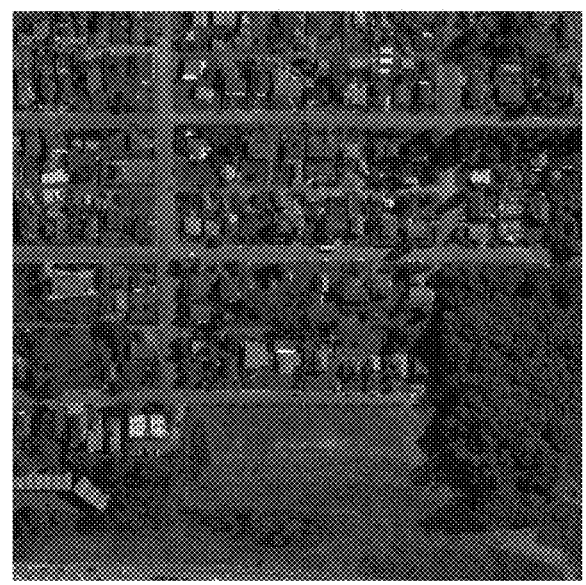
FIG. 2 shows an example of aerial imagery, according to an illustrative embodiment of the concepts and technologies described herein.

The aerial imagery data source 112A can correspond to a database or other source of aerial imagery. The phrase "aerial imagery" as used herein can be used to refer to satellite photographs or other imagery, aerial photographs or other imagery, or other photographs or imagery that can depict and/or relate to a particular area or geographic location. An example of aerial imagery is shown in FIG. 2, which corresponds to a satellite photograph of a particular geographic area. It should be understood that this example is illustrative, and therefore should not be construed as being limiting in any way.

The aerial imagery data source 112A can correspond, in some embodiments, to a satellite imagery database, an aerial imagery database, or the like. In one contemplated embodiment, the aerial imagery data source 112A can correspond to a database or other data source that may be used by a mapping application or program such as, for example, a member of the GOOGLE MAPS and/or GOOGLE EARTH families of products from Google LLC in Mountain View, Calif.; a member of the APPLE MAPS family of products from Apple, Inc. in Cupertino, Calif.; a member of the BING MAPS family of products from Microsoft Corporation in Redmond, Wash.; other databases and/or mapping applications or programs. It should be noted that some mapping applications and/or programs may not make aerial imagery accessible to public and/or commercial users, so the above examples are illustrative and should not be construed as being limiting in any way. As is known, aerial imagery can be correlated to geographic locations and as such, a particular aerial image (e.g., a satellite photograph) can be correlated to a particular set of coordinates on the surface of the earth, thereby enabling correlation of the aerial imagery with other information associated with the geographic location. This will be explained in more detail below. It should be understood that this example is illustrative, and therefore should not be construed as being limiting in any way.

Figure 3:
FIG. 3 shows an example of a map representation, according to an illustrative embodiment of the concepts and technologies described herein.

The map representation data source 112B can store one or more map representations. The phrase "map representation" as used herein can be used to refer to a processed and/or modified representation of the aerial imagery illustrated and described herein. Thus, the map representations can relate to a particular area or geographic location. In some embodiments, the particular area or geographic location of the map representation can be correlated to an aerial image. An example of a map representation is shown in FIG. 3. It can be appreciated from collective reference to FIGS. 2-3 that the map representation of FIG. 3 can correspond to the aerial imagery shown in FIG. 2. It should be understood that this example is illustrative, and therefore should not be construed as being limiting in any way.

According to various embodiments of the concepts and technologies disclosed herein, the map representations can include visual representations of the aerial images. The representations can be generated manually and/or based on image recognition and/or image processing. In some embodiments, color masks can be digitally created from the aerial images to create the map representations using various image processing technologies such as color thresholding, edge detection, color substitutions, and the like. In the illustrated embodiment shown in FIG. 3, color coded substitutions and masks have been applied such that light green in the map representation represents trees, dark green in the map representation represents poles, blue in the map representation represents flat roofed buildings, red in the map representation represents slanted roofed buildings, and white in the map representation represents anything other than trees, poles, flat roofed buildings, or slanted roofed buildings. Of course, this example color coding is merely illustrative of the concepts and technologies disclosed herein and should not be construed as being limiting in any way.

According to various embodiments of the map representations, many other categories, colors, color-based schemes, pattern-based schemes, and/or non-color-based schemes are contemplated and are possible. The map representations can provide an approach in which different structures and/or materials are recognizable, where computers can be trained to create the map representations based on the aerial imagery. In operation, the aerial imagery can be provided to an image processing filter, process, application, service, or the like, and the map representation can be generated using the image processing and the aerial imagery. It should be understood that this example is illustrative, and therefore should not be construed as being limiting in any way.

The geolocation information data source 112C, can include geolocation information for an area or geographic location. The geolocation information can include, for example, corners or boundaries for an area or geographic location. This geolocation information can be used to define an area or location associated with the aerial imagery and/or the map representation. The use of the geolocation information will be addressed in more detail below. Briefly, however, coordinates or other geolocation information for the aerial imagery and/or the map representations can be used to correlate the aerial imagery and/or the map representations to one another and/or to other information. It should be understood that this example is illustrative, and therefore should not be construed as being limiting in any way.

The network data source 112D can store various types of network data. According to various embodiments of the concepts and technologies disclosed herein, the network data can be associated with any number of geographic locations and/or areas. According to various embodiments, the network data stored by the network data source 112D can include, for example, geographic locations of networking equipment, performance and/or quality of service statistics measured at specific geographic locations and/or in specific geographic areas, equipment information associated with equipment at specific geographic locations and/or areas, combinations thereof, or the like.

In some embodiments, the network data can include, for example, data that defines geolocations of one or more eNodeB's, data that defines geolocations of one or more bins (measurement points for a signal measurement such as reference signal receive power ("RSRP"), RSRP values for one or more bins, transmission power and/or other characteristics of broadcast or transmitted signals from the eNodeBs, perceived signal strength at one or more measurement points and/or geographic locations or areas, and/or other network information, any and/or all of which can be correlated to a particular geographic location using the geolocation data and/or other information. These and other types of network data can be used in various manners as illustrated and described herein.

The obstruction definitions data source 112E can store data that can define obstructions. The obstructions defined by the obstructions definitions may correspond to real world obstructions that may exist in a particular place that is represented by aerial imagery and/or map representations. Thus, the obstructions definitions can define obstructions that may be recognized in the aerial imagery and/or the map representations.

In some embodiments, the obstruction definitions can define types of obstructions and/or can relate types of obstructions to specific colors, patterns, and/or hues in the aerial imagery and/or the map representations. The obstruction definitions therefore can correlate the color coding, patterns, and/or other representations of the map representations to a type of obstruction, a category of obstruction, and/or a particular obstruction. In some embodiments, the obstruction definitions can specify an impact on signal strength (e.g., RSRP) based on obstructions between an eNodeB (or other transceiver) and a measurement point (e.g., location of a signal measurement). Thus, by correlating this information with the map representation, the impact or expected impact of obstructions on signal strength can be predicted. It should be understood that this example is illustrative, and therefore should not be construed as being limiting in any way.

The correlation information data source 112F can store correlation data. The correlation data can relate the multiple types of data stored by the data sources 112 to one another. In some embodiments, geolocation data can be used as the correlation data, whereby the map representations, the aerial imagery, and the network data (for example) can be correlated to one another by way of the geolocation data. In some other embodiments, a reference or key can be used as the correlation data, whereby a matching key (or multiple relatable keys) can relate one type of data (e.g., the aerial imagery) to another type of data (e.g., the map representations). Because the data stored by the data sources 112 can be related to one another in additional and/or alternative manners, it should be understood that these examples are illustrative, and therefore should not be construed as being limiting in any way.

The other data sources 112N can store other data that may be used in accordance with the various embodiments of the concepts and technologies disclosed herein. The other data sources 112N also can store existing coverage information. Existing coverage information can depict and/or include locations of eNodeBs or other transceivers/transmitters, locations of bins or other measurement points, transmission power information, perceived and/or actual received signal power or other signal information, combinations thereof, or the like. In some embodiments, the other data can include operational information for various network elements (e.g., an output power, operational characteristics, and/or the like), coverage models (past, current, and/or predicted), and/or other information as illustrated and described herein. It should be understood that this example is illustrative, and therefore should not be construed as being limiting in any way.

According to various embodiments of the concepts and technologies disclosed herein, as will be explained in more detail below, the server computer 102 can be configured to receive and/or obtain one or more instances of data from the data sources 112 as the modeling and prediction data 114. Although the modeling and prediction data 114 is illustrated as including various data components, it should be understood that the modeling and prediction data 114 can be obtained in more than one data transmission and/or that each instance of modeling and prediction data 114 can include one or more data components (but not necessarily more than one data component).

Thus, various instances of the modeling and prediction data 114 can include, at any particular time and/or collective over multiple instances, one or more data components that can include, but are not limited to, one or more instances of aerial imagery, map representations, geolocation information, network data, obstruction definitions, correlation information, other information, combinations thereof, or the like. According to various embodiments of the concepts and technologies disclosed herein, the server computer 102 can receive and/or otherwise obtain one or more instances of the modeling and prediction data 114 at various times and/or for various purposes, as will be explained in more detail below, particularly with reference to FIGS. 4-5. The modeling and prediction data 114 can be obtained by the server computer 102 in response to a request, in some instances, or the modeling and prediction data 114 can be transmitted to the server computer 102 by the one or more data sources 112, in some embodiments.

The modeling and prediction engine 108 can be configured to obtain the one or more instances of the modeling and prediction data 114 and to create, based on the data included in the one or more instances of the modeling and prediction data 114, one or more existing coverage models 116. According to various embodiments of the concepts and technologies disclosed herein, the existing coverage models 116 can be generated based on one or more types of the modeling and prediction data 114. In particular, the modeling and prediction engine 108 can be configured to obtain an instance of the modeling and prediction data 114 that includes aerial imagery, and the modeling and prediction engine 108 can be configured to process the aerial imagery included in the modeling and prediction data 114. In some embodiments, the modeling and prediction engine 108 can apply one or more image processing algorithms and/or other functionality to the aerial imagery to create the map representations. As noted above, the image processing algorithms and/or other functionality can include, but are not limited to, color substitutions and/or thresholding processes, edge detection algorithms, other thresholding processes, color and/or pattern masks, combinations thereof, or the like.

The map representations, one example of which is shown in FIG. 3, can represent one or more obstructions in a particular area or geographic location that is depicted in a corresponding instance of aerial imagery. As noted above, FIG. 3 shows a color-coded version of the map representations, but this is merely one example embodiment of the concepts and technologies disclosed herein and should not be construed as being limiting in any way, as patterns, textures, colors, and/or other technologies can be used to represent different materials in the map representations. The modeling and prediction data 114 also can be configured to obtain one or more of the network data, geolocation data, and/or correlation information. The modeling and prediction data 114 can correlate the network data to the map representation to relate one or more network metrics (e.g., RSRP) to the map representation.

Figure 4:
FIG. 4 shows an example signal strength representation, according to an illustrative embodiment of the concepts and technologies described herein.

FIG. 4 schematically illustrates how the bin-eNodeB RSRP measurements (which can correlate to, for example, measured received power at the bin from the associated eNodeB) can be correlated to the map representation to create a signal strength representation 400. The signal strength representation 400 can, in some embodiments, capture signal strength values and representations of obstructions. It should be understood that the correlation of measurements to map representations need not be visual, so FIG. 4 may be understood as a schematic representation and is not necessarily an embodiment of the results of the correlation described herein.

In the example embodiment of the signal strength representation 400 shown in FIG. 4, the black lines (one example of which is labeled in FIG. 4 as 402) can correspond to a line of sight between an eNodeB (one example of which is labeled in FIG. 4 as being located at 404) and a measurement point for a signal strength measurement or other performance indicator (one example of which is labeled in FIG. 4 as being located at 406). The orange line 408 shown in FIG. 4 can correlate to and/or can visually indicate boundaries for a slice or other portion ("slice") 118 of the signal strength representation 400. It should be understood that this example is illustrative, and therefore should not be construed as being limiting in any way.

The slice 118 can correspond to a geographic area through and/or over which the line of sight 402 passes. Thus, the slice 118 can capture a portion of the map representation. The portion of the map representation can include a portion that correlates to the geographic location of the eNodeB 404, a portion that correlates to the geographic location of the measurement point 406, a portion that can include all geographic areas between the eNodeB and the measurement point (e.g., the line of sight 402), and obstructions in one or more and/or all of the geographic areas. While the signal strength representation 400 can reflect existing coverage at an area or geographic location, the multiple slices 118 of the signal strength representation 400 can be stored and/or used by the modeling and prediction engine 108 to create the one or more existing coverage models 116.

Figure 5A:
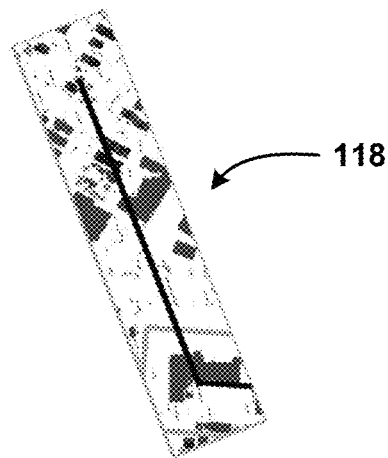
FIGS. 5A-5B schematically illustrate cropping and rotating a slice of a signal strength representation to create an existing coverage model, according to an illustrative embodiment of the concepts and technologies described herein.
Figure 5B:
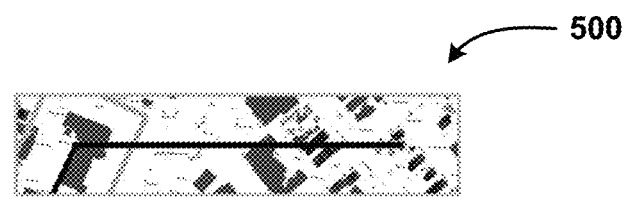

An example of the cropping of the example slice 118 of the signal strength representation 400 shown in FIG. 4 is shown in FIG. 5A. An example of the rotation of the example cropped slice 118 of the signal strength representation 400 shown in FIG. 4 is shown in FIG. 5B to obtain a rotated and cropped slice 500. The slices 118 and/or the rotated and cropped slices 500 of the signal strength representation 400 can be stored and used to create the one or more existing coverage models 116, as will be illustrated and described herein (FIG. 1 illustrates the slices 118 being stored by the server computer 102). It can be appreciated with reference to FIG. 5B that the rotated and cropped slice 500 can capture and/or represent obstructions around a particular area and can, in association with the known signal strength and/or other measurement associated with the eNodeB and/or measurement point, be understood to relate how obstructions can affect signal strength in at least one geographic area. It should be understood that this example is illustrative, and therefore should not be construed as being limiting in any way.

According to various embodiments of the concepts and technologies disclosed herein, one or more slices 118 can be provided to the modeling and prediction engine 108 to create the existing coverage model 116. In particular, the slices 118 can be provided as input to the modeling and prediction engine 108, which can use artificial intelligence and/or one or more neural networks to create a model and/or abstraction (e.g., the existing coverage model 116) of how obstructions affect signal strength over various geographic locations. The existing coverage model 116 can correspond, in various embodiments, to a neural network (e.g., a set of algorithms and/or other data) that can represent the model and/or abstraction as noted above. Input such as aerial imagery associated with a geographic location can be provided as input to the existing coverage model 116, and output from the existing coverage model 116 can correspond to a prediction of how signal strength will be perceived in the geographic area associated with the aerial imagery. This will be explained in more detail herein.

More particularly, the modeling and prediction engine 108 can be configured to create a predicted coverage model 120, which can be based on the existing coverage model 116. In particular, the modeling and prediction engine 108 can, in some embodiments, receive a request for a coverage model associated with a particular area or geographic location. In various embodiments, there may not exist any existing coverage information for the particular area or geographic location for which the coverage information is being requested (e.g., there may exist no signal strength measurements, etc., for that area). As such, the modeling and prediction engine 108 can be configured to treat the request as a predicted coverage model request 122 or other request for a predicted coverage model 120 for the particular area or geographic location. In response to receiving the predicted coverage model request 122 (or determining that a request is to be understood as the predicted coverage model request 122), the modeling and prediction engine 108 can be configured to create the predicted coverage model 120. It should be understood that this example is illustrative, and therefore should not be construed as being limiting in any way.

To create the predicted coverage model 120, the modeling and prediction engine 108 can be configured to obtain an instance of the modeling and prediction data 114 that includes aerial imagery for the particular area and/or geographic location associated with the predicted coverage model request 122 or other request for a predicted coverage model 120 for a particular area or geographic location. Specifically, the modeling and prediction engine 108 can be configured to obtain an instance of aerial imagery, which can correspond to the particular area and/or geographic location for which existing coverage information does not yet exist.

The modeling and prediction engine 108 can apply one or more image processing operations to the instance of aerial imagery for the particular area and/or geographic location in some embodiments, or use the aerial imagery without applying any processing operations thereto. In some embodiments, the modeling and prediction engine 108 can be configured to apply the image processing operations to create a map representation for the particular area and/or geographic location in a manner that can be similar to that illustrated and described above with regard to creating the map representation for the area or geographic location to create the existing coverage model 116. Thus, it can be appreciated that the modeling and prediction engine 108 can detect obstructions in the aerial imagery associated with the particular area and/or geographic location. According to various embodiments of the concepts and technologies disclosed herein, however, the modeling and prediction engine 108 also may not have access to network data for the new geographic area or location, and therefore cannot create the existing coverage model 116. It should be understood that this example is illustrative, and therefore should not be construed as being limiting in any way.

Thus, embodiments of the concepts and technologies disclosed herein can include the modeling and prediction engine 108 determining, based on some information (e.g., a planned network build order, an input geographic location, or the like), a relevant portion of the map representation for which the predicted coverage model 120 is to be created. In some embodiments, the modeling and prediction engine 108 can determine a new location of an eNodeB that is to be installed at the particular area and/or geographic location, and can find a corresponding location in the map representation that was created for the particular area and/or geographic location. It should be understood that this example is illustrative, and therefore should not be construed as being limiting in any way.

The modeling and prediction engine 108 can be configured to determine predicted coverage for the particular area and/or geographic location. In particular, the modeling and prediction engine 108 can be configured to use the aerial imagery and/or map representation as input for the existing coverage model 116, and to obtain output from the existing coverage model 116. The output can correspond to the predicted coverage model 120. The existing coverage model 116 can effectively identify, in the aerial imagery and/or map representation, areas between a planned eNodeB location and another point in the area or geographic location that have obstructions that are similar to a measurement point and an eNodeB in the existing coverage model 116. In other words, the modeling and prediction engine 108 can be configured to (via providing the aerial imagery and/or map representation to the existing coverage model 116) compare aerial imagery and/or the map representation created for the particular area and/or geographic location (for which the predicted coverage model 120 is being sought) to map representations and/or aerial imagery represented in the existing coverage model 116. It should be understood that this example is illustrative, and therefore should not be construed as being limiting in any way.

To accomplish the above, the modeling and prediction engine 108 can, in some embodiments, analyze the map representation created for the particular area and/or geographic area and can compare various slices of that map representation to various slices 118 represented by the existing coverage model 116. Again, the existing coverage model 116 can correspond to a neural network and/or other artificial intelligence, so these steps can be inherent in the calculations performed by the modeling and prediction engine 108. The existing coverage model 116 and/or the modeling and prediction engine 108 can effectively search for distances between eNodeBs and measurement points that match distances between eNodeBs and bins in the existing coverage model 116 and/or that are determined to be similar as explained in more detail below. The modeling and prediction engine 108 also can effectively analyze the map representation associated with the particular area and/or geographic location and compare that to the multiple slices 118 of the existing coverage models 116 to identify portions of the map representation that have obstructions along a line of sight between an eNodeB and another point, where these obstructions are similar to obstructions along the lines of sight 402 of the existing coverage model 116 (e.g., slices 500) of the new map representation (e.g., the signal strength representation 400). Thus, known signal strength measurements can be extrapolated and/or abstracted to the geographic location (for which the predicted coverage model 120 is being requested) using the existing coverage model 116. It should be understood that this example is illustrative, and therefore should not be construed as being limiting in any way.

Even if an existing coverage model 116 is not generated, the modeling and prediction engine 108 can be configured to predict signal coverage using the slices 118. In particular, the modeling and prediction engine 108 can be configured to effectively match a slice 118 having obstructions that are the most similar to the obstructions in a map representation associated with a geographic region or area (e.g., an installation site) and identify that slice 118 as being relevant to the geographic region or area (e.g., the installation site). According to various embodiments of the concepts and technologies disclosed herein, "relevance" of a slice 118 can be determined based on a degree of similarity between the slice 118 and the obstruction model and/or other depiction or representation of obstructions in the particular area and/or geographic location. In some embodiments, the degree of similarity can be mathematically defined based on portions (e.g., area, volume, distance, or the like) of the slice 500 and portions of the obstruction model.

For example, if a slice 118 indicates that, along a line of sight from an eNodeB to a bin that is located two thousand feet from the eNodeB, there are twenty percent obstructions and eighty percent open space, this slice 118 may be "relevant" to an obstruction model that has, in one direction, a line of sight between an eNodeB and any point two thousand feet from the eNodeB, twenty percent obstructions along the line of sight and eighty percent open space along the line of sight. Of course, more granularity may be used to find one or more slices 118 of relevance such as, for example, slices 118 having similar types of obstructions at similar distances, etc., relative to the obstruction model.

In one such example, if a slice 118 indicates that, along a line of sight from an eNodeB to a bin that is located three thousand feet from the eNodeB, there are houses along five percent of the line of sight, trees along twenty five percent of the line of sight, buildings along twenty five percent of the line of sight, and open space along the remaining forty five percent of the line of sight, this slice 118 may be "relevant" to an obstruction model that has, in one direction, a line of sight between an eNodeB and any point three thousand feet from the eNodeB, houses along three to seven percent of the line of sight, trees along twenty to thirty percent of the line of sight, buildings along twenty to thirty percent of the line of sight, and open space along the remaining fifty seven to thirty three percent of the line of sight. Of course, these examples are illustrative. In various embodiments of the concepts and technologies disclosed herein, thresholds and/or percentages of similarity can be defined for the obstructions, and obstructions can be measured in specific terms (e.g., houses, trees, etc.) or general terms (obstructions, open space, etc.). Thus, it should be understood that these examples are illustrative, and therefore should not be construed as being limiting in any way.

The existing coverage model 116 (or the slice 118 used to create the existing coverage model 116) can then be used to create the predicted coverage model 120. In particular, coverage can be predicted in the particular area and/or geographic area based on coverage in the existing coverage model 116. It should be understood that this example is illustrative, and therefore should not be construed as being limiting in any way.

According to various embodiments, the modeling and prediction engine 108 can operate as a callable or requestable service, in some embodiments. In particular, the user device 110 can be configured to create a request for the predicted coverage model 120, namely a predicted coverage model request 122. The user device 110 can send or otherwise provide the predicted coverage model request 122 to the server computer 102, and the modeling and prediction engine 108 can provide the matching predicted coverage model 120 in response to the request. It should be understood that this example is illustrative, and therefore should not be construed as being limiting in any way.

In practice, a modeling and prediction engine 108 can be hosted by a device such as a server computer 102. The modeling and prediction engine 108 can be configured to generate a predicted coverage model 120 for a particular geographic location or area such as, for example, a possible or planned installation site for network hardware (e.g., an eNodeB, transceiver, or other hardware) or another location. The modeling and prediction engine 108 can receive an explicit request or call for the predicted coverage model 120, in some embodiments. In some other embodiments, the modeling and prediction engine 108 can receive a request for coverage information (e.g., signal strength measurements) for a particular location, and the modeling and prediction engine 108 can determine, e.g., based on an analysis of existing coverage information, that coverage information for the geographic location and/or area exists or is accessible. Thus, the modeling and prediction engine 108 can determine that the predicted coverage model 120 is to be created. It should be understood that this example is illustrative, and therefore should not be construed as being limiting in any way.

If no existing coverage model 116 for the particular geographic location and/or area exists or is accessible, the modeling and prediction engine 108 can be configured to create the predicted coverage model 120. In particular, the modeling and prediction engine 108 can access (or create) an existing coverage model 116 that can provide a generalized model for how signal strength is affected by obstructions in a variety of geographic areas. In various embodiments, the existing coverage model 116 can be generated by the modeling and prediction engine 108 based on existing coverage information for one or more geographic areas. The existing coverage information can be obtained by the modeling and prediction engine 108 and the modeling and prediction engine 108 can generate one or more slices 118 as illustrated and described herein. One or more of the slices 118 can represent a transceiver such as an eNodeB or gNodeB that can emit a signal at a signal strength, a bin or other measurement point for determining a perceived signal strength, transmission power and/or received transmission power, and/or perceived signal strength or other signal information as perceived at the bin. The modeling and prediction engine 108 can be configured to create the existing coverage model 116 based on the slices 118.

In some embodiments, the modeling and prediction engine 108 can be configured to use artificial intelligence (e.g. a neural network) to create the existing coverage model 116, where some or all of the slices 118 can be provided as input to the modeling and prediction engine 108 and/or a neural network associated therewith, and the modeling and prediction engine 108 can create the existing coverage model 116. The existing coverage model 116 can correspond to a set of algorithms (e.g., a neural network) that can obtain an aerial image, map representation, and/or other representation of a particular geographic area as input and create a predicted coverage model 120 based on the aerial imagery and/or the map representation. It should be understood that this example is illustrative, and therefore should not be construed as being limiting in any way.

The modeling and prediction engine 108 can identify a geographic location associated with the request for the predicted coverage model 120 and obtain aerial imagery and/or a map representation for the particular geographic location and/or area for which the predicted coverage model 120 is being created. The modeling and prediction data 114 can include an aerial image for the particular geographic location and/or area for which the predicted coverage model 120 is being created. It should be understood that this example is illustrative, and therefore should not be construed as being limiting in any way.

The modeling and prediction engine 108 can generate the predicted coverage model 120 for the particular geographic location and/or area for which the predicted coverage model 120 is being created and/or requested. The predicted coverage model 120 can be used and/or interpreted to estimate coverage in the particular geographic location and/or area for which the predicted coverage model 120 is being created based on information included in the existing coverage model 116 (e.g., perceived signal strength at specific measurement locations that are separated from the eNodeB that emitted the signal, where the distance and obstructions between the measurement location and the eNodeB are known from the existing coverage model 116). The modeling and prediction engine 108 can provide the predicted coverage model 120 to a requestor for use and/or analysis.

Although the above description has addressed obstructions such as trees, buildings, poles, and the like, it can be appreciated that other factors (e.g., factors other than obstructions) may impact perceived signal strength at some measurement point. For example, temperature, humidity, and/or other environmental factors may affect perceived signal strength at a measurement location. Thus, embodiments of the concepts and technologies disclosed herein can also consider these and/or other environmental conditions when identifying relevant existing coverage models 116 and/or when generating predicted coverage models 120.

In some embodiments of the concepts and technologies disclosed herein, machine learning and/or artificial intelligence ("AI") can be used to compare the aerial imagery and/or map representation to the existing coverage model 116. In some embodiments, the modeling and prediction engine 108 can include one or more neural networks that can use the slices 118 as input to generate the existing coverage model 116, and an aerial image or map representation as input to the existing coverage model 116 to obtain the predicted coverage model 120, where the existing coverage model 116 can correspond to a neural network and/or other type of artificial intelligence. In some embodiments, the neural networks can compare these two inputs and search for and/or identify a best match. Thus, in some embodiments the aerial imagery and/or map representation can be used as input and matching obstructions and/or areas can be found in the existing coverage model 116. It should be understood that this example is illustrative, and therefore should not be construed as being limiting in any way.

FIG. 1 illustrates one server computer 102, one network 104, one user device 110, and six data sources 112. It should be understood, however, that various implementations of the operating environment 100 can include zero, one, or more than one server computer 102; zero, one, or more than one network 104; zero, one, or more than one user device 110; and/or zero, one, two, three, four, five, six, or more than six data sources 112. As such, the illustrated embodiment should be understood as being illustrative, and should not be construed as being limiting in any way.

Figure 6:
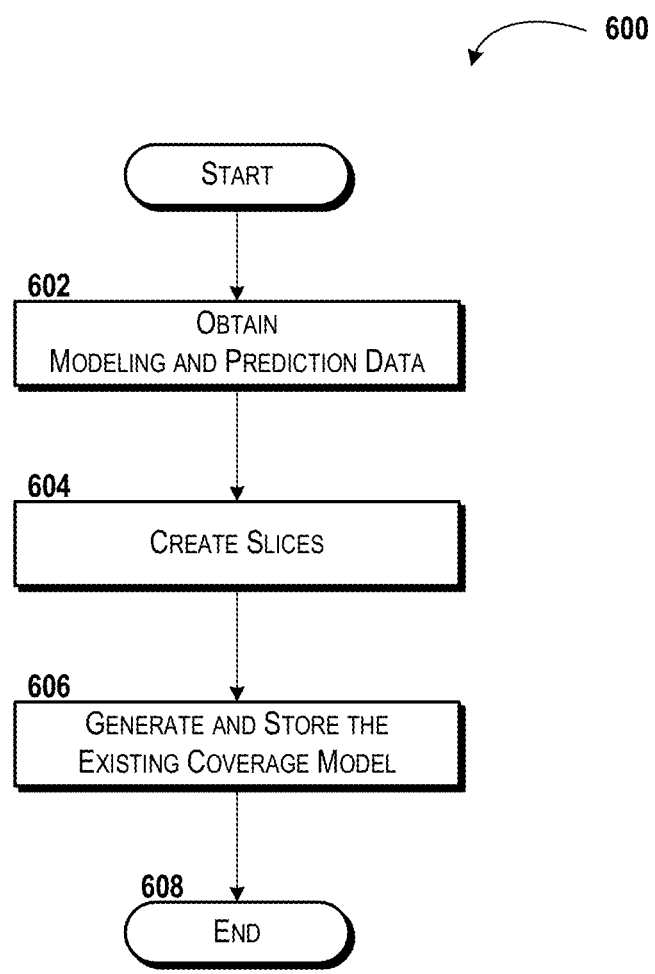
FIG. 6 is a flow diagram showing aspects of a method for creating existing coverage models, according to an illustrative embodiment of the concepts and technologies described herein.

Turning now to FIG. 6, aspects of a method 600 for creating an existing coverage model 116 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102, to perform one or more operations and/or causing the processor to direct other components of the computing system or device to perform one or more of the operations.

For purposes of illustrating and describing the concepts of the present disclosure, the method 600 is described herein as being performed by the server computer 102 via execution of one or more software modules such as, for example, the modeling and prediction engine 108. It should be understood that additional and/or alternative devices and/or network nodes can provide the functionality described herein via execution of one or more modules, applications, and/or other software including, but not limited to, the modeling and prediction engine 108. Thus, the illustrated embodiments are illustrative, and should not be viewed as being limiting in any way.

The method 600 begins at operation 602. At operation 602, the server computer 102 can obtain one or more instances of the modeling and prediction data 114. As explained above, the server computer 102 can obtain, in operation 602, one or more instances of the modeling and prediction data 114, which can include one or more instances of data. For example, the modeling and prediction data 114 can include one or more of: one or more instances of aerial imagery (e.g., a satellite photograph of a particular location, aerial imagery of a particular location, etc.); one or more map representations (e.g., images generated by performing image processing on the aerial imagery); one or more instances of network data; one or more instances of geolocation data; one or more instances of correlation data; one or more instances of other data; combinations thereof; or the like. As noted above, the modeling and prediction data 114 does not necessarily include, in all embodiments, one instance of each of the above-noted types of information. Rather, the modeling and prediction data 114 includes at least one instance of at least one of these types of data. It should be understood that this example is illustrative, and therefore should not be construed as being limiting in any way.

In some embodiments, the server computer 102 can obtain an aerial image of a particular area or geographic location. The server computer 102 can complete one or more image processing operations on the aerial image to create the map representation, according to some embodiments. In some other embodiments, the aerial image can be processed at other times and/or by other devices or services and saved by the map representation data source 112B as the map representation. Thus, in operation 602, the server computer 102 can obtain a map representation from the data sources 112 instead of creating the map representation based on the aerial imagery. It should be understood that this example is illustrative, and therefore should not be construed as being limiting in any way.

In operation 602, the server computer 102 also can obtain one or more instances of network data. As explained above, the network data can include, for example, geographic locations of networking equipment, performance and/or quality of service information as measured or detected at specific geographic locations and/or in specific geographic areas, equipment information associated with equipment at specific geographic locations and/or areas, combinations thereof, or the like. In one specific implementation, the network data can include, for example, data that defines geolocations of one or more eNodeB's, data that defines geolocations of one or more bins, RSRP values for one or more of the bins, transmission power and/or other characteristics of broadcast or transmitted signals from the eNodeBs, perceived signal strength at one or more measurement points and/or geographic locations or areas, and/or other network information. The server computer 102 can be configured to correlate the network data to the map representation using geolocation data and/or other information as explained herein. It should be understood that this example is illustrative, and therefore should not be construed as being limiting in any way.

From operation 602, the method 600 can proceed to operation 604. At operation 604, the server computer 102 can create slices 118. In operation 604, the server computer 102 can create a representation that can be a combination of the map representation and the network data such as, for example, the signal strength representation 400 shown in FIG. 4. It should be understood that this example is illustrative, and therefore should not be construed as being limiting in any way.

As explained above, the server computer 102 can create information that relates locations of the eNodeBs and the bins as determined from the network data (and the geolocation data in some embodiments) and associate that information with the map representation. Thus, for example, a particular area or location may have an associated map representation and the server computer 102 can add information relating to each eNodeB and/or bin in that particular area with signal strength and/or other performance information. As explained above with reference to FIGS. 4-5B, the server computer 102 can create slices 118 from the signal strength representation 400.

One or more of the slices 118 can represent a geographic area and/or location that includes an eNodeB, a bin (measurement point) at which a signal from that eNodeB is measured, and a line-of-sight between the eNodeB and the bin. Because the slice 118 can be formed form the signal strength representation 400 illustrated and described herein, the slice 118 can also include information that relates to a measured signal strength (or other performance characteristic) as measured at the bin. According to some example embodiments of the concepts and technologies disclosed herein, the performance characteristic included in and/or associated with the slice 118 can correspond to an RSRP measured at the bin.

As noted above, in some other embodiments, the performance characteristic can include, but is not limited to, one or more of RSRP values for one or more bins, transmission power and/or other characteristics of broadcast or transmitted signals from the eNodeBs, perceived signal strength at one or more measurement points and/or geographic locations or areas, and/or other network information, any and/or all of which can be correlated to a particular geographic location using the geolocation data and/or other information. It should be understood that these examples are illustrative, and therefore should not be construed as being limiting in any way. According to various embodiments of the concepts and technologies disclosed herein, one or more of the slices 118 can be used to create the existing coverage model 116 as illustrated and described herein.

As can be appreciated with reference to FIGS. 4-5B, the slices 118 can also depict one or more obstructions and/or other features associated with a geographic location and/or area. The obstructions can be defined by patterns, colors, and/or other information included in the slices 118, in some embodiments. In some embodiments, one or more obstruction definitions may be used by the server computer 102 or other devices to interpret the slices 118 to determine what the obstructions are. It should be understood that this example is illustrative, and therefore should not be construed as being limiting in any way.

From operation 604, the method 600 can proceed to operation 606. At operation 606, the server computer 102 can generate and store the existing coverage model 116. In various embodiments, the modeling and prediction engine 108 can provide the slices 118 to a neural network, other artificial intelligence, and/or other functionality associated with the modeling and prediction engine 108 as input, and the modeling and prediction engine 108 can create the existing coverage model 116 from the slices 118. More particularly, the one or more slices 118 (and in various embodiments, the number of slices 118 may be very large) can be abstracted and/or extrapolated by the neural networks and/or other artificial intelligence associated with the modeling and prediction engine 108 to create the existing coverage model 116. The existing coverage model 116 can be used to operate on aerial imagery and/or map representations to predict signal strength based on known patterns and/or data points associated with the slices 118. Thus, the modeling and prediction engine 108 can create the existing coverage model 116 and the modeling and prediction engine 108 can use the existing coverage model 116 to predict coverage. It should be understood that this example is illustrative, and therefore should not be construed as being limiting in any way.

In various embodiments of the concepts and technologies disclosed herein the existing coverage model 116 can be stored at the server computer 102 and/or at a data storage location that is associated with and/or accessible by the server computer 102. As noted above, the existing coverage model 116 can correspond to a neural network and/or other algorithms and/or artificial intelligence, and as such can be stored in various data storage facilities. In some embodiments of the concepts and technologies disclosed herein, the server computer 102 can transmit the existing coverage model 116 to one or more data source 112 (e.g., the other data source 112N) for storage. It should be understood that this example is illustrative, and therefore should not be construed as being limiting in any way.

While the above description of FIG. 6 has described the creation of an existing coverage model 116, it should be understood that embodiments of the concepts and technologies disclosed herein can be used to create any number of existing coverage models 116. In particular, some embodiments of the concepts and technologies disclosed herein create multiple existing coverage models 116, where one or more of the existing coverage models 116 can be used based on various considerations that may make one of the existing coverage models 116 a better choice for use in creating a predicted coverage model 120 than a second of the existing coverage models 116.

In particular, for example, in some embodiments a first existing coverage model 116 can be created for a first geographic area or location having a first climate; a first noise floor; a first proximity to geological, geographical, and/or manmade features; and/or the like; and a second existing coverage model 116 can be created for a second geographic area or location having a second climate; a second noise floor; a second proximity to geological, geographical, and/or manmade features; or the like. When a predicted coverage model 120 is requested, a determination can be made as to whether the geographic area associated with the predicted coverage model request 122 is more similar to the first geographic location or the second geographic location, and the associated existing coverage model 116 can be selected based on this determination. Thus, it should be understood that multiple existing coverage models 116 can be created and used in accordance with some embodiments the concepts and technologies disclosed herein. It should be understood that this example is illustrative, and therefore should not be construed as being limiting in any way.

Additionally, in some embodiments of the concepts and technologies disclosed herein, the creation of the existing coverage model 116 by the modeling and prediction engine 108 can correspond to a neural network associated with the modeling and prediction engine 108 being trained, where the trained neural network can be referred to herein as the existing coverage model 116, and wherein output of data from that neural network can be referred to as a predicted coverage model 120. In particular, the neural network can be trained using the slices 118, where the neural network can learn (e.g., using artificial intelligence) that certain obstructions, weather, geographic features, noise floor information, temperature and/or other weather considerations, etc. can affect signal strength as perceived at measurement points around a radio or transceiver such as an eNodeB, gNodeB, or the like. Thus, using artificial intelligence, the neural network can be trained using the slices 118 to become the existing coverage model 116, wherein the existing coverage model 116 is the same neural network, but is now trained to determine how signal strength will be perceived based on obstructions and/or other features associated with a particular area. It should be understood that this example is illustrative, and therefore should not be construed as being limiting in any way.

Additionally, it should be understood that the neural networks illustrated and described herein, e.g., the existing coverage models 116 can be updated at substantially any time. In particular, as new measurements are obtained (e.g., perceived signal strength information), the existing coverage model 116 can be recreated, retrained, and/or updated to incorporate the new data. Thus, embodiments of the concepts and technologies disclosed herein can update the existing coverage models 116 at substantially any time to provide an up-to-date model of signal propagation for one or more geographic locations and/or areas. It should be understood that this example is illustrative, and therefore should not be construed as being limiting in any way.

From operation 606, the method 600 can proceed to operation 608. The method 600 can end at operation 608.

Figure 7:
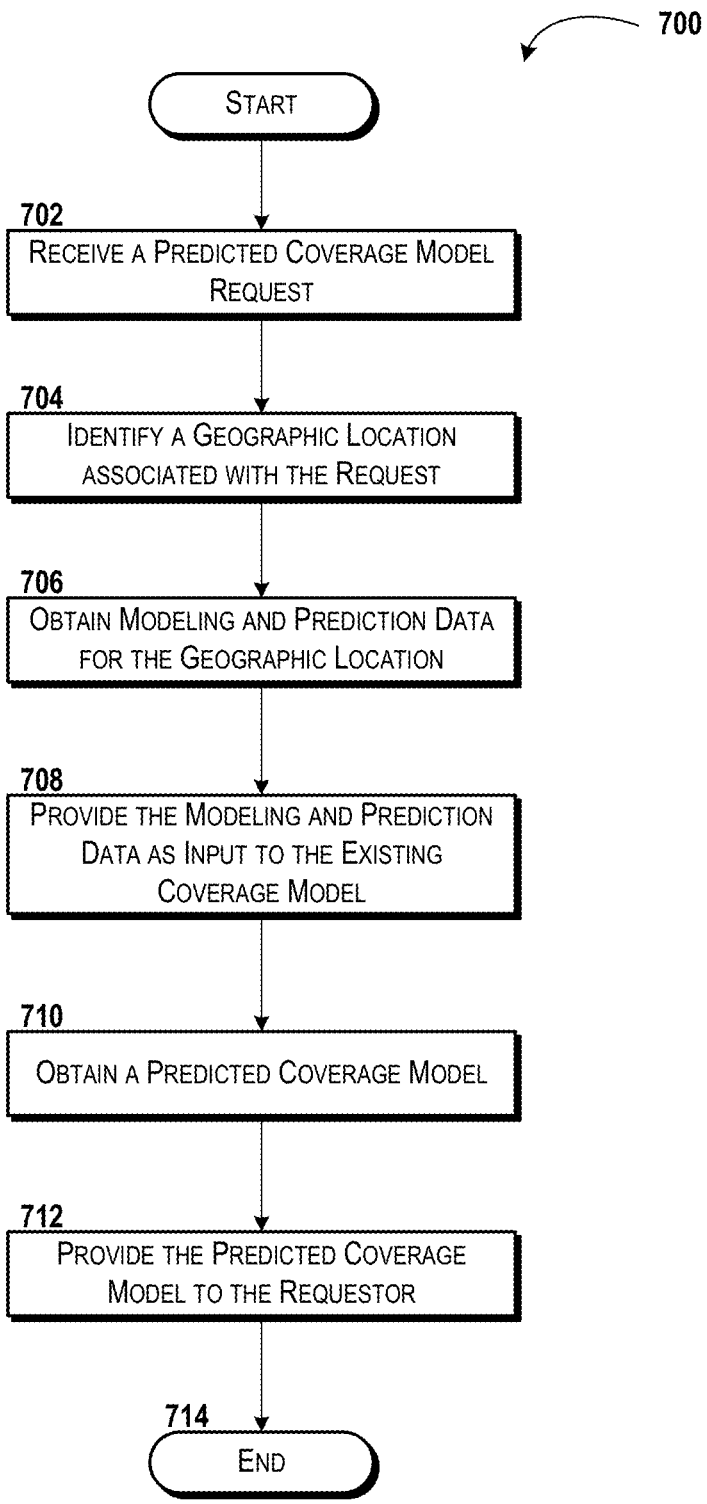
FIG. 7 is a flow diagram showing aspects of a method for creating and using network coverage models, according to an illustrative embodiment of the concepts and technologies described herein.

Turning now to FIG. 7, aspects of a method 700 for using network coverage models will be described in detail, according to an illustrative embodiment. For purposes of illustrating and describing the concepts of the present disclosure, the method 700 is described herein as being performed by the server computer 102 via execution of one or more software modules such as, for example, the modeling and prediction engine 108. It should be understood that additional and/or alternative devices and/or network nodes can provide the functionality described herein via execution of one or more modules, applications, and/or other software including, but not limited to, the modeling and prediction engine 108. Thus, the illustrated embodiments are illustrative, and should not be viewed as being limiting in any way.

The method 700 begins at operation 702. At operation 702, the server computer 102 can receive a request for a predicted coverage model 120. In some embodiments, the request received in operation 702 can include a predicted coverage model request 122. According to various embodiments of the concepts and technologies disclosed herein, the request received in operation 702 can be received as an application call, a service call, a request, an interaction with a portal, an interaction with an API, and/or other types of requests, call, and/or interactions.

According to some embodiments, the server computer 102 can receive, at some time, a request for coverage information (e.g., existing coverage information) associated with a geographic location and/or area. The server computer 102 can access various data sources 112 and/or other information to determine if any existing coverage information associated with the area or geographic location exists. If the server computer 102 determines that the existing coverage information associated with the area or geographic location does not exist, the server computer 102 can construe the request received in operation 702 as a request for a predicted coverage model 120 such as the predicted model request 122 illustrated and described herein.

In some other embodiments, the server computer 102 can receive an explicit request for a predicted coverage model 120 (e.g., a user or other entity can create a request for the predicted coverage model based on an intended installation or the like). Because the request received in operation 702 can be received in additional and/or alternative manners, it should be understood that these examples are illustrative, and therefore should not be construed as being limiting in any way. Regardless of how the request is created, in operation 702 the server computer 102 can determine that a predicted coverage model 120 is to be created for a requestor.

From operation 702, the method 700 can proceed to operation 704. At operation 704, the server computer 102 can determine a geographic location associated with the request received in operation 702. According to various embodiments, the server computer 102 can analyze the request received in operation 702 and determine, based on the request, a geographic location associated with the request. In one example embodiment, the request received in operation 702 can be associated with a build site (e.g., an installation site for an eNodeB, gNodeB, or other hardware), and the server computer 102 can identify the geographic location associated with the build site (e.g., geographic coordinates such as GPS coordinates associated with the eNodeB that is to be installed).

In another example embodiment, the request can include explicit information defining the geographic location (e.g., the request can be made via a portal that can request GPS coordinates, an address, and/or other information that can be analyzed by the server computer 102 to determine the geographic location). In yet other embodiments, a map interface or other interface can be used to check locations based on satellite images, for example, and the server computer 102 can determine the geographic locations based on those interactions. For example, a user may access a map view via a user interface to check one or more installation locations based on a map view, a satellite view, an aerial view, or the like, and the locations checked via this interface can be translated and/or correlated to a geographic location such as an address, a set of coordinates, or the like. Because the geographic location associated with the request can be determined in additional and/or alternative manners, it should be understood that these examples are illustrative, and therefore should not be construed as being limiting in any way.

From operation 704, the method 700 can proceed to operation 706. At operation 706, the server computer 102 can obtain one or more instances of modeling and prediction data 114 that are associated with the geographic location determined in operation 704. According to various embodiments of the concepts and technologies disclosed herein, the server computer 102 can obtain, in operation 706, one or more instances of aerial imagery associated with the geographic location determined in operation 704 and/or one or more map representations associated with the geographic location determined in operation 704.

For example, a set of coordinates (e.g., GPS coordinates) or street address determined in operation 704 can be used to obtain aerial imagery and/or a map representation associated with the geographic location (e.g., via a query or request made with a mapping service or the like). As illustrated in the embodiment shown in FIG. 1, the aerial imagery and/or a map representation can be obtained from one or more data sources 112, though this is not necessarily the case. In particular, the server computer 102 can obtain the aerial imagery and/or a map representation from a local data storage device, in some embodiments, for example, from a memory associated with the server computer 102, from a data store, and/or from other devices. Regardless of the source of the aerial imagery and/or a map representation, the server computer 102 can obtain the aerial imagery and/or a map representation in operation 706 for the geographic location determined in operation 704.

In some embodiments, the server computer 102 can obtain aerial imagery in operation 706, and the server computer 102 can be configured to generate a map representation from the aerial imagery obtained in operation 706. As noted above, the server computer 102 can apply one or more image analysis operations (e.g., edge detection, thresholding, color masks, color swaps, and/or other operations) to the aerial imagery obtained in operation 706 to create the map representation. The map representation can represent obstructions in the geographic area and/or at or around the geographic location.

In some embodiments, the map representation can include a color-coded model of the obstructions in the geographic area and/or at or around the geographic location, a pattern-coded model of the obstructions in the geographic area and/or at or around the geographic location, and/or other schemes to represent obstructions in the geographic area and/or at or around the geographic location. As noted above, the map representation can represent trees, poles, open areas, water, buildings, houses, etc. Thus, in some embodiments of operation 706, the server computer 102 can analyze the aerial imagery to generate the map representation. It should be understood that this example is illustrative, and therefore should not be construed as being limiting in any way.

From operation 706, the method 700 can proceed to operation 708. At operation 708, the server computer 102 can provide the modeling and prediction data 114 obtained in operation 706 (e.g., the aerial imagery and/or a map representation) as input to the existing coverage model 116. As explained above, the existing coverage model 116 can correspond to a neural network (e.g., a set of algorithms), other artificial intelligence, and/or other functionality that can represent how signal propagation (based on transmission power and perceived signal reception information, for example) occurs in various environments due to environmental conditions such as, for example, obstructions, temperature, humidity, combinations thereof, or the like. The server computer 102 can provide the modeling and prediction data 114 obtained in operation 706 to the existing coverage model 116 as input, and the existing coverage model 116 (or the server computer 102 and/or the modeling and prediction engine 108 executing the existing coverage model 116) can perform operations on the input to create an output.

From operation 708, the method 700 can proceed to operation 710. At operation 710, the server computer 102 can generate and/or otherwise obtain a predicted coverage model 120. As can be appreciated from the description of operation 708 above, the predicted coverage model 120 can correspond to output from the existing coverage model 116. According to various embodiments of the concepts and technologies disclosed herein, the predicted coverage model 120 can represent expected or otherwise predicted signal strength and/or signal propagation in an area associated with the aerial imagery, map representation, and/or other form of modeling and prediction data 114 obtained in operation 706. The predicted coverage model 120 can be created as a data set, a visual representation, and/or as a set of slices 118 that can be modeled and yet similar to the slices 118 obtained from the existing coverage information illustrated and described herein. It should be understood that this example is illustrative, and therefore should not be construed as being limiting in any way.

The predicted coverage model 120 can represent and/or can be used to predict perceived signal strength at multiple locations in the geographic location being analyzed in the method 700. In some embodiments, it may be ideal, as noted above, the predicted coverage model 120 can represent signal strength and/or propagation in multiple or even all directions relative to a particular installation site or other location, so the predicted coverage model 120 can be used to predict a perceived signal strength at almost any location in the geographic area being analyzed.

It can be appreciated, however, that perceived signal strength (or other performance metrics) for a location being analyzed in the method 700 may be extrapolated by the server computer 102 using the predicted coverage model 120, in some embodiments. In some other embodiments, the server computer 102 may only predict perceived signal strength (or other performance metrics) at distances that match slices 118 used to create the existing coverage model 116, though in other embodiments the known information can be extrapolated and/or abstracted to identify expected or predicted signal strength at any location. It therefore should be understood that the predicted coverage model 120 can be used to measure predicted or expected signal performance for a new site in a known location, and not necessarily for a new location that does not have any associated existing coverage information. It should be understood that these examples are illustrative, and therefore should not be construed as being limiting in any way.

From operation 710, the method 700 can proceed to operation 712. At operation 712, the server computer 102 can provide the predicted coverage model 120 to the requestor. According to various embodiments of the concepts and technologies disclosed herein, the server computer 102 can transmit the predicted coverage model 120 to a requestor (e.g., the user device 110), cause other devices to transmit the predicted coverage model 120 to a requestor, or otherwise present the predicted coverage model 120 to the requestor (e.g., present the predicted coverage model 120 in a user interface, web page, or the like). It should be understood that this example is illustrative, and therefore should not be construed as being limiting in any way.

From operation 714, the method 700 can proceed to operation 716. The method 700 can end at operation 716.

Figure 8:
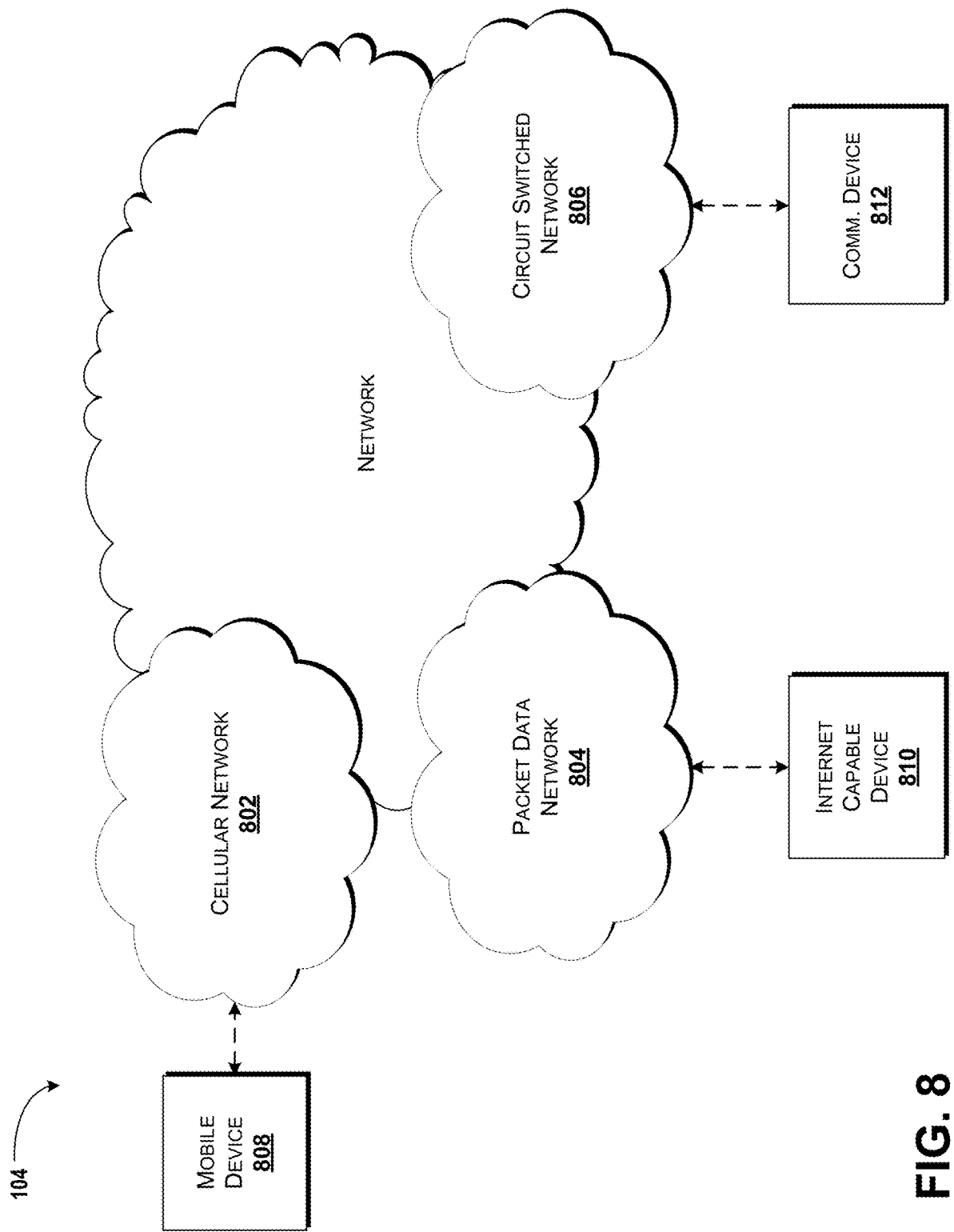
FIG. 8 schematically illustrates a network, according to an illustrative embodiment of the concepts and technologies described herein.

Turning now to FIG. 8, additional details of the network 104 are illustrated, according to an illustrative embodiment. The network 104 includes a cellular network 802, a packet data network 804, for example, the Internet, and a circuit switched network 806, for example, a publicly switched telephone network ("PSTN"). The cellular network 802 includes various components such as, but not limited to, base transceiver stations ("BTSs"), NodeB's, eNodeB's, gNodeB's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, a cellular telephone, a user equipment, a mobile terminal, a PDA, a laptop computer, a handheld computer, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSDPA), and HSPA+. The cellular network 802 also is compatible with 4G, 4.5G, and 5G mobile communications standards as well as evolved and future mobile standards.

The packet data network 804 includes various devices, for example, servers, computers, databases, and other devices in communication with one another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system (POTS). The functionality of a circuit switched network 806 or other circuit-switched network are generally known and will not be described herein in detail.

The cellular network 802 is shown in communication with the packet data network 804 and a circuit switched network 806, though it should be appreciated that this is not necessarily the case. One or more Internet-capable devices 810, for example, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810. In the specification, the network 104 is used to refer broadly to any combination of the cellular network 802, the packet data network 804, and/or the circuit switched network 806. It should be appreciated that substantially all of the functionality described with reference to the network 104 can be performed by the cellular network 802, the packet data network 804, and/or the circuit switched network 806, alone or in combination with other networks, network elements, and the like.

Figure 9:
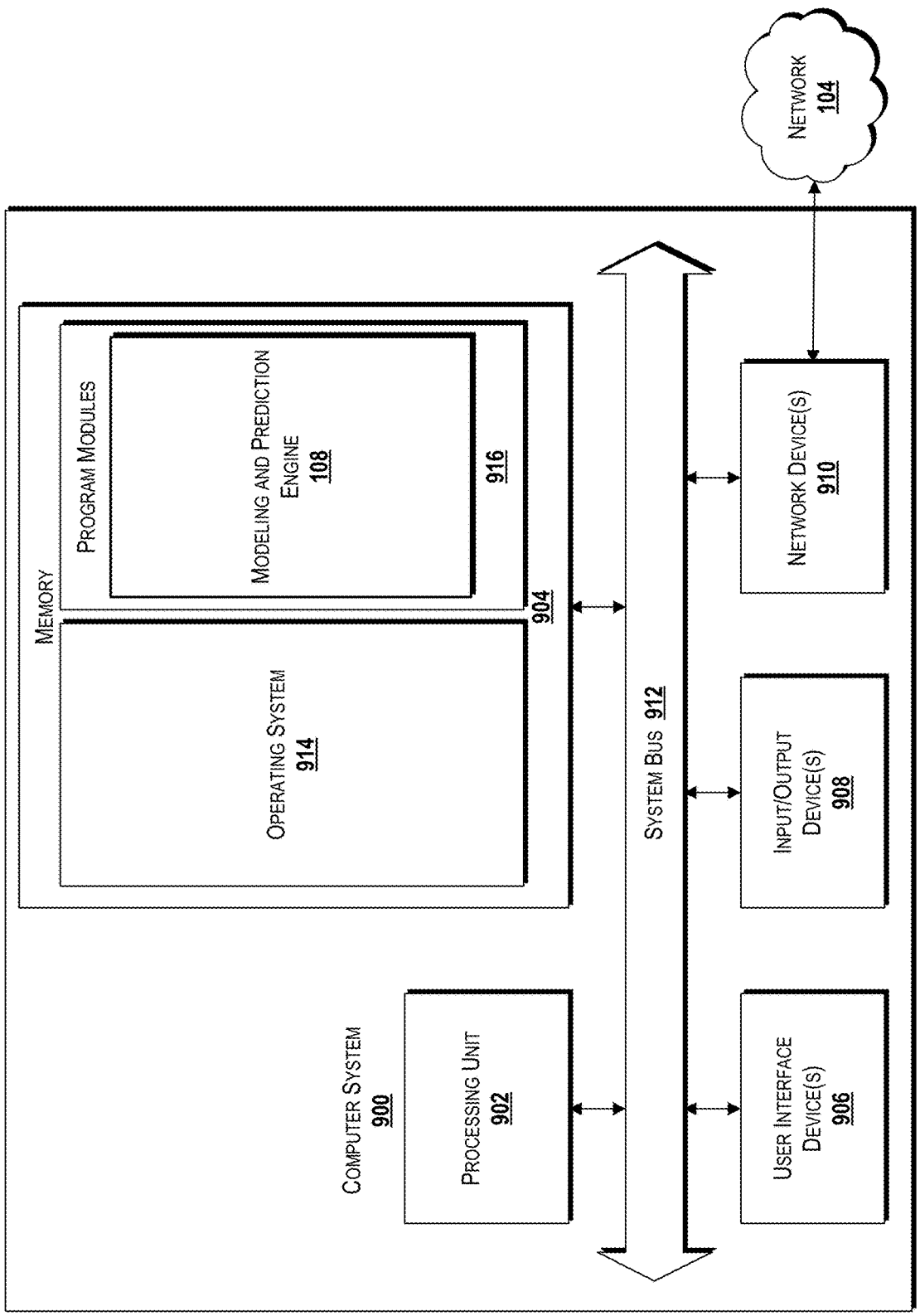
FIG. 9 is a block diagram illustrating an example computer system configured to provide the functionality described herein for creating and using network coverage models, according to some illustrative embodiments of the concepts and technologies described herein.

FIG. 9 is a block diagram illustrating a computer system 900 configured to provide the functionality described herein for creating and using network coverage models, in accordance with various embodiments of the concepts and technologies disclosed herein. The computer system 900 includes a processing unit 902, a memory 904, one or more user interface devices 906, one or more input/output ("I/O") devices 908, and one or more network devices 910, each of which is operatively connected to a system bus 912. The bus 912 enables bi-directional communication between the processing unit 902, the memory 904, the user interface devices 906, the I/O devices 908, and the network devices 910.

The processing unit 902 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 904 communicates with the processing unit 902 via the system bus 912. In some embodiments, the memory 904 is operatively connected to a memory controller (not shown) that enables communication with the processing unit 902 via the system bus 912. The memory 904 includes an operating system 914 and one or more program modules 916. The operating system 914 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 916 may include various software and/or program modules described herein. In some embodiments, for example, the program modules 916 include the modeling and prediction engine 108. This and/or other programs can be embodied in computer-readable media containing instructions that, when executed by the processing unit 902, perform one or more of the methods 600 or 700 described in detail above with respect to FIGS. 6-7 and/or other functionality as illustrated and described herein. It can be appreciated that, at least by virtue of the instructions embodying the methods 600 or 700 and/or other functionality illustrated and described herein being stored in the memory 904 and/or accessed and/or executed by the processing unit 902, the computer system 900 is a special-purpose computing system that can facilitate providing the functionality illustrated and described herein. According to embodiments, the program modules 916 may be embodied in hardware, software, firmware, or any combination thereof. Although not shown in FIG. 9, it should be understood that the memory 904 also can be configured to store the modeling and prediction data 114, the existing coverage model 116, the slices 118, the predicted coverage models 120, the predicted coverage model request 122, and/or other data, if desired.

By way of example, and not limitation, computer-readable media may include any available computer storage media or communication media that can be accessed by the computer system 900. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 900. In the claims, the phrase "computer storage medium" and variations thereof does not include waves or signals per se and/or communication media.

The user interface devices 906 may include one or more devices with which a user accesses the computer system 900. The user interface devices 906 may include, but are not limited to, computers, servers, personal digital assistants, cellular phones, or any suitable computing devices. The I/O devices 908 enable a user to interface with the program modules 916. In one embodiment, the I/O devices 908 are operatively connected to an I/O controller (not shown) that enables communication with the processing unit 902 via the system bus 912. The I/O devices 908 may include one or more input devices, such as, but not limited to, a keyboard, a mouse, or an electronic stylus. Further, the I/O devices 908 may include one or more output devices, such as, but not limited to, a display screen or a printer.

The network devices 910 enable the computer system 900 to communicate with other networks or remote systems via a network, such as the network 104. Examples of the network devices 910 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a wireless network that uses Worldwide Interoperability for Microwave Access ("WIMAX") communication standards, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN")

Figure 10:
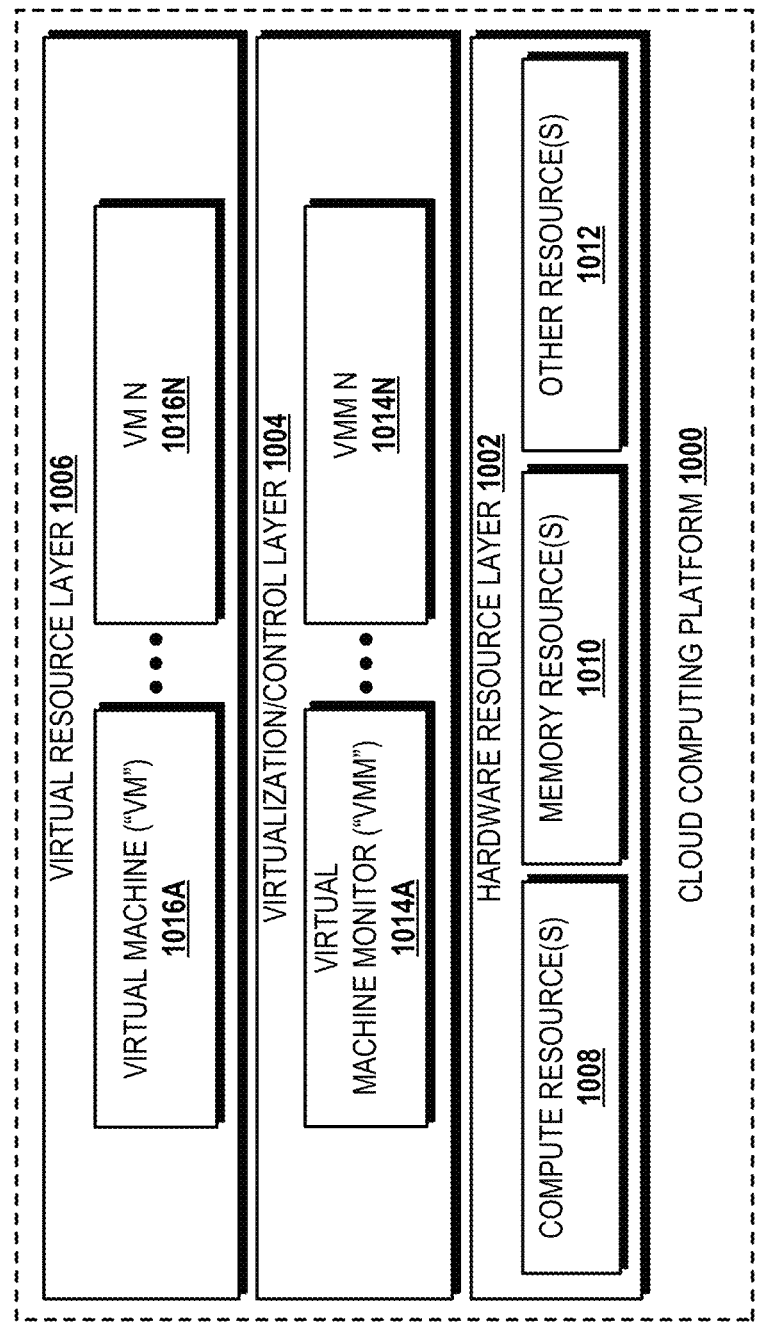
FIG. 10 is a diagram illustrating a computing environment capable of implementing aspects of the concepts and technologies disclosed herein, according to some illustrative embodiments of the concepts and technologies described herein.

FIG. 10 illustrates an illustrative cloud computing platform architecture 1000 capable of executing the software components described herein for creating and using network coverage models and/or for interacting with the modeling and prediction engine 108. Thus, it can be appreciated that in some embodiments of the concepts and technologies disclosed herein, the cloud computing platform architecture 1000 illustrated in FIG. 10 can be used to provide the functionality described herein with respect to the server computer 102, the user device 110, one or more of the data sources 112, and/or other devices.

The cloud computing platform architecture 1000 thus may be utilized to execute any aspects of the software components presented herein. Thus, according to various embodiments of the concepts and technologies disclosed herein, the modeling and prediction engine 108 can be implemented, at least in part, on or by elements included in the cloud computing platform architecture 1000 illustrated and described herein. Those skilled in the art will appreciate that the cloud computing platform architecture 1000 shown in FIG. 10 is a simplification of but only one possible implementation of an illustrative cloud computing platform, and as such, the cloud computing platform architecture 1000 should not be construed as being limiting in any way.

In the illustrated embodiment, the cloud computing platform architecture 1000 can include a hardware resource layer 1002, a virtualization/control layer 1004, and a virtual resource layer 1006. These layers and/or other layers can be configured to cooperate with each other and/or other elements of a cloud computing platform architecture to perform operations as will be described in detail herein. While connections are shown between some of the components illustrated in FIG. 10, it should be understood that some, none, or all of the components illustrated in FIG. 10 can be configured to interact with one another to carry out various functions described herein. In some embodiments, the components are arranged so as to communicate via one or more networks such as, for example, the network 104 illustrated and described hereinabove (not shown in FIG. 10). Thus, it should be understood that FIG. 10 and the following description are intended to provide a general understanding of a suitable environment in which various aspects of embodiments can be implemented, and should not be construed as being limiting in any way.

The hardware resource layer 1002 can provide hardware resources. In the illustrated embodiment, the hardware resources can include one or more compute resources 1008, one or more memory resources 1010, and one or more other resources 1012. The compute resource(s) 1008 can include one or more hardware components that can perform computations to process data, and/or to execute computer-executable instructions of one or more application programs, operating systems, services, and/or other software including, but not limited to, the modeling and prediction engine 108 illustrated and described herein.

According to various embodiments, the compute resources 1008 can include one or more central processing units ("CPUs"). The CPUs can be configured with one or more processing cores. In some embodiments, the compute resources 1008 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 1008 can include one or more discrete GPUs. In some other embodiments, the compute resources 1008 can include one or more CPU and/or GPU components that can be configured in accordance with a co-processing CPU/GPU computing model. Thus, it can be appreciated that in some embodiments of the compute resources 1008, a sequential part of an application can execute on a CPU and a computationally-intensive part of the application can be accelerated by the GPU. It should be understood that this example is illustrative, and therefore should not be construed as being limiting in any way.

In some embodiments, the compute resources 1008 also can include one or more system on a chip ("SoC") components. It should be understood that an SoC component can operate in association with one or more other components as illustrated and described herein, for example, one or more of the memory resources 1010 and/or one or more of the other resources 1012. In some embodiments in which an SoC component is included, the compute resources 1008 can be or can include one or more embodiments of the SNAPDRAGON brand family of SoCs, available from QUALCOMM of San Diego, Calif.; one or more embodiment of the TEGRA brand family of SoCs, available from NVIDIA of Santa Clara, Calif.; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Tex.; one or more customized versions of any of the above SoCs; and/or one or more other brand and/or one or more proprietary SoCs.

The compute resources 1008 can be or can include one or more hardware components arranged in accordance with an ARM architecture, available for license from ARM HOLDINGS of Cambridge, United Kingdom. Alternatively, the compute resources 1008 can be or can include one or more hardware components arranged in accordance with an x86 architecture, such as an architecture available from INTEL CORPORATION of Mountain View, Calif., and others. Those skilled in the art will appreciate the implementation of the compute resources 1008 can utilize various computation architectures and/or processing architectures. As such, the various example embodiments of the compute resources 1008 as mentioned hereinabove should not be construed as being limiting in any way. Rather, implementations of embodiments of the concepts and technologies disclosed herein can be implemented using compute resources 1008 having any of the particular computation architecture and/or combination of computation architectures mentioned herein as well as other architectures.

Although not separately illustrated in FIG. 10, it should be understood that the compute resources 1008 illustrated and described herein can host and/or execute various services, applications, portals, and/or other functionality illustrated and described herein. Thus, the compute resources 1008 can host and/or can execute the modeling and prediction engine 108 or other applications or services illustrated and described herein.

The memory resource(s) 1010 can include one or more hardware components that can perform or provide storage operations, including temporary and/or permanent storage operations. In some embodiments, the memory resource(s) 1010 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 1008, subject to the definition of "computer storage media" provided above (e.g., as excluding waves and signals per se and/or communication media as defined in this application).

Although not illustrated in FIG. 10, it should be understood that the memory resources 1010 can host or store the various data illustrated and described herein including, but not limited to, the modeling and prediction data 114, the existing coverage model 116, the slice 118, the predicted coverage models 120, the predicted coverage model request 122, and/or other data, if desired. It should be understood that this example is illustrative, and therefore should not be construed as being limiting in any way.

The other resource(s) 1012 can include any other hardware resources that can be utilized by the compute resources(s) 1008 and/or the memory resource(s) 1010 to perform operations. The other resource(s) 1012 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 1002 can be virtualized by one or more virtual machine monitors ("VMMs") 1014A-1014N (also known as "hypervisors;" hereinafter "VMMs 1014"). The VMMs 1014 can operate within the virtualization/control layer 1004 to manage one or more virtual resources that can reside in the virtual resource layer 1006. The VMMs 1014 can be or can include software, firmware, and/or hardware that alone or in combination with other software, firmware, and/or hardware, can manage one or more virtual resources operating within the virtual resource layer 1006.

The virtual resources operating within the virtual resource layer 1006 can include abstractions of at least a portion of the compute resources 1008, the memory resources 1010, the other resources 1012, or any combination thereof. These abstractions are referred to herein as virtual machines ("VMs"). In the illustrated embodiment, the virtual resource layer 1006 includes VMs 1016A-1016N (hereinafter "VMs 1016").

Based on the foregoing, it should be appreciated that systems and methods for creating and using network coverage models have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations comprising
receiving a request for a predicted coverage model that represents a first signal propagation in a first portion of a network that covers a first area associated with a first geographic location,
obtaining an aerial image that depicts the first area,
providing the aerial image to an existing coverage model, wherein the existing coverage model comprises a neural network, and wherein the existing coverage model is based on a second signal propagation in a second portion of the network that covers a second area associated with a second geographic location, and
obtaining, using the aerial image and from the existing coverage model, the predicted coverage model for the first area.

2. The system of claim 1, wherein the existing coverage model is generated by:
obtaining a map representation of the second area;
obtaining network data for the second area; and
generating, based on the map representation and the network data, the existing coverage model, wherein the network data comprises signal information measured at a point in the second area.

3. The system of claim 2, wherein the predicted coverage model represents obstructions between two points in the first area and an expected signal measurement at one of the two points.

4. The system of claim 2, wherein the map representation is generated by performing an image processing operation on a further aerial image that depicts the second area, wherein a first color depicts an open space in the map representation, and wherein a second color depicts an obstruction in the map representation.

5. The system of claim 4, wherein the obstruction comprises one of a building or a tree.

6. The system of claim 1, wherein the predicted coverage model is generated by:
determining a geographic location associated with the request, wherein the geographic location comprises the first geographic location;
obtaining a further aerial image that depicts a portion of the first area; and
performing an image processing operation on the further aerial image to generate a further map representation.

7. The system of claim 1, wherein the existing coverage model is generated by:
obtaining a map representation of the second area;
obtaining network data for the second area;
creating, based on the map representation and the network data, a plurality of slices, each of the plurality of slices depicting a first location of a first device that emits a signal, a second location at which the signal is measured, a line of sight between the first location and the second location, and obstructions along the line of sight; and
creating the existing coverage model based on the plurality of slices.

8. A method comprising:
receiving, at a computer comprising a processor, a request for a predicted coverage model that represents a first signal propagation in a first portion of a network that covers a first area associated with a first geographic location;
obtaining, by the processor, an aerial image that depicts the first area;
providing, by the processor, the aerial image to an existing coverage model, wherein the existing coverage model comprises a neural network, and wherein the existing coverage model is based on a second signal propagation in a second portion of the network that covers a second area associated with a second geographic location; and
obtaining, by the processor and using the aerial image, the predicted coverage model for the first area, wherein the predicted coverage model is obtained from the existing coverage model.

9. The method of claim 8, wherein the existing coverage model is generated by:
   obtaining a map representation of the second area;
   obtaining network data for the second area; and
   generating, based on the map representation and the network data, the existing coverage model, wherein the network data comprises signal information measured at a point in the second area.

10. The method of claim 9, wherein the predicted coverage model represents obstructions between two points in the first area and an expected signal measurement at one of the two points.

11. The method of claim 9, wherein the map representation is generated by performing an image processing operation on a further aerial image that depicts the second area, wherein a first color depicts an open space in the map representation, and wherein a second color depicts an obstruction in the map representation.

12. The method of claim 8, wherein the predicted coverage model is generated by:
   determining a geographic location associated with the request, wherein the geographic location comprises the first geographic location;
   obtaining a further aerial image that depicts a portion of the first area; and
   performing an image processing operation on the further aerial image to generate a further map representation.

13. The method of claim 8, wherein the existing coverage model is generated by:
   obtaining a map representation of the second area;
   obtaining network data for the second area;
   creating, based on the map representation and the network data, a plurality of slices, each of the plurality of slices depicting a first location of a first device that emits a signal, a second location at which the signal is measured, a line of sight between the first location and the second location, and obstructions along the line of sight; and
   creating the existing coverage model based on the plurality of slices.

14. A computer storage medium having computer-executable instructions stored thereon that, when executed by a processor, cause the processor to perform operations comprising:
   receiving a request for a predicted coverage model that represents a first signal propagation in a first portion of a network that covers a first area associated with a first geographic location;
   obtaining an aerial image that depicts the first area;
   providing the aerial image to an existing coverage model, wherein the existing coverage model comprises a neural network, and wherein the existing coverage model is based on a second signal propagation in a second portion of the network that covers a second area associated with a second geographic location; and
   obtaining, using the aerial image and from the existing coverage model, the predicted coverage model for the first area.

15. The computer storage medium of claim 14, wherein the existing coverage model is generated by:
   obtaining a map representation of the second area;
   obtaining network data for the second area; and
   generating, based on the map representation and the network data, the existing coverage model, wherein the network data comprises signal information measured at a point in the second area.

16. The computer storage medium of claim 15, wherein the predicted coverage model represents obstructions between two points in the first area and an expected signal measurement at one of the two points.

17. The computer storage medium of claim 15, wherein the map representation is generated by performing an image processing operation on a further aerial image that depicts the second area, wherein a first color depicts an open space in the map representation, and wherein a second color depicts an obstruction in the map representation.

18. The computer storage medium of claim 17, wherein the obstruction comprises one of a building or a tree.

19. The computer storage medium of claim 14, wherein the predicted coverage model is generated by:
   determining a geographic location associated with the request, wherein the geographic location comprises the first geographic location;
   obtaining a further aerial image that depicts a portion of the first area; and
   performing an image processing operation on the further aerial image to generate a further map representation.

20. The computer storage medium of claim 14, wherein the existing coverage model is generated by:
   obtaining a map representation of the second area;
   obtaining network data for the second area;
   creating, based on the map representation and the network data, a plurality of slices, each of the plurality of slices depicting a first location of a first device that emits a signal, a second location at which the signal is measured, a line of sight between the first location and the second location, and obstructions along the line of sight; and
   creating the existing coverage model based on the plurality of slices.

* * * * *